Feb. 6, 1973 — M. A. FRIEDER — 3,715,016

ROTATIONAL RATE REGULATOR

Filed Sept. 29, 1970

INVENTOR.
MARCUS A. FRIEDER
BY
ATTORNEY

United States Patent Office 3,715,016
Patented Feb. 6, 1973

3,715,016
ROTATIONAL RATE REGULATOR
Marcus A. Frieder, Tenafly, N.J., assignor to
The Bendix Corporation
Filed Sept. 29, 1970, Ser. No. 76,353
Int. Cl. F16d 59/00
U.S. Cl. 188—184  1 Claim

ABSTRACT OF THE DISCLOSURE

Means including an element pivotally mounted to a rotating member and effected by the rotational rate of the member above a predetermined limit for pivoting to engage a stationary member whereby a force for restraining rotation is generated.

BACKGROUND OF THE INVENTION

Field of the invention

This invention relates to means for limiting rotational rate to prevent a rotating member from being subjected to excessive loads.

Description of the prior art

The rotational rate of the gimbal on a single axis control moment gyro (CMG) must be limited to prevent unncessarily high loads on the gyro rotor bearings or on the gyro rotor itself since high loads can impair the life and safety factor of these components. Prior to the present invention, there has not been effective means for providing such limiting that has been simple and yet compatible with the design characteristics of the gyro.

SUMMARY OF THE INVENTION

This invention contemplates a spring restrained pawl pivotally mounted to a rotating member. When the rotational rate is sufficiently high, the pawl pivots under the combined action of the spring restraint and centrifugal action and frictionally engages adjacent stationary structure to generate a force for restraining the rotation. Since friction may be inadequate to prevent high rotational rates when the rotating member is externally torqued, pawl engagement detents are provided on the stationary member whereby the restraining force is increased. To alleviate potential shock due to sudden stops caused by engagement of the pawl in the detents, the pawl may include a compliant member. The pawl may be mounted to the rotating member through angular acceleration sensitive linkage for improving the response of the device.

One object of this invention is to provide a limiter for limiting the rotational rate of a member such as the gimbal shaft on a single gimbal control moment gyro.

Another object of this invention is to accomplish said limiting by utilizing friction between the rotating member and an adjacent stationary member to provide a force for restraining rotation.

Another object of this invention is to increase the restraining force by providing detents on the stationary member for engaging the pawl.

Another object of this invention is to provide the pawl with a compliant member to alleviate potential shock due to rapid stopping caused by engagement of the pawl in the detents.

Another object of this invention is to improve the response of the limiter by mounting the pawl to the rotating member through an angular acceleration sensitive linkage.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

DESCRIPTION OF THE INVENTION

Figure 1:
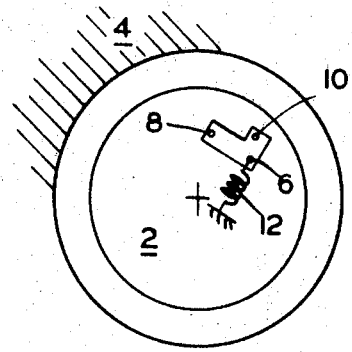
FIG. 1 is a diagrammatic representation of an embodiment of the invention showing a spring restrained pawl pivotally mounted to a rotating member.

With reference to FIG. 1 there is shown a shaft 2 which supports, for purposes of illustration, a gyro gimbal (not shown) and rotates therewith. Shaft 2 is surrounded by a stationary structure 4 which may be a portion of the gyro housing or frame.

A pawl 6 is mounted eccentric to shaft 2 by a pivot 8. Pawl 6 has a balance weight 10 mounted thereto at an end opposite pivot 8. Rotation of pawl 6 about pivot 8 is restrained by a spring 12 mounted to the pawl and mounted to shaft 2.

Figure 2:
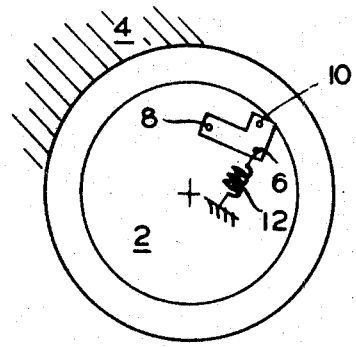
FIG. 2 is a diagrammatic representation showing the action of centrifugal force on the pawl of FIG. 1, wherein said pawl is urged into frictional contact with an adjacent stationary member for providing a force to restrain rotation.

When the rotational rate of shaft 2 exceeds a predetermined limit, pawl 6 rotates about pivot 8 under the combined action of spring 12 and the centrifugal force due to the rotation. As shown in FIG. 2, pawl 6 thereupon engages stationary member 4 and the frictional force thus generated restrains shaft rotation.

Generally, the restraining force will be inadequate to effectively restrain shaft rotation when the gyro gimbal is externally torqued, as is often the case. By the arrangement shown in FIG. 3, whereby detents such as that designated by the numeral 14 are machined or otherwise provided on stationary structure 4A, the restraining force is increased.

Thus, when the rotational rate is sufficiently high, pawl 6, under the combined action of spring 12 and centrifugal force, rotates about pivot 8 to engage detent 14 to generate a restraining force. The restraining force can be made as large as desired, depending on the detent design.

Figure 3:
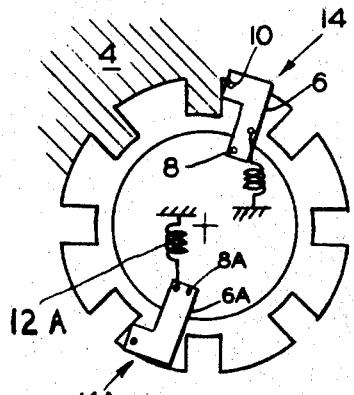
FIG. 3 is a diagrammatic representation of an embodiment of the invention showing a pair of opposed pawls engaged in detents on the stationary member for increasing the restraining force.

As further indicated in FIG. 3, more than one pawl can be used to effectively increase the restraining force and for this purpose a pawl 6A mounted opposite pawl 6, pivoted at a point 8A and restrained by a spring 12A, is shown engaged in a detent 14A.

Figure 4:
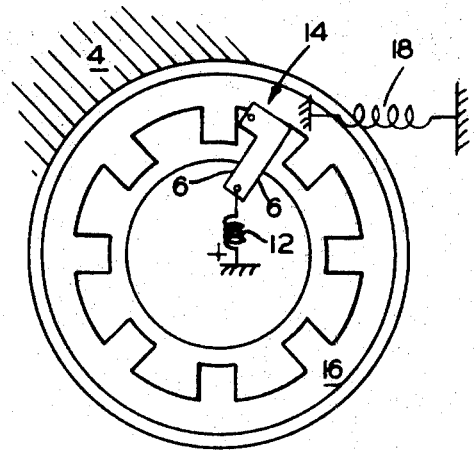
FIGS. 4 and 5 are diagrammatic representations showing embodiments of the invention for alleviating potential shock due to engagement of the pawls of FIG. 3 in their respective detents.
Figure 5:
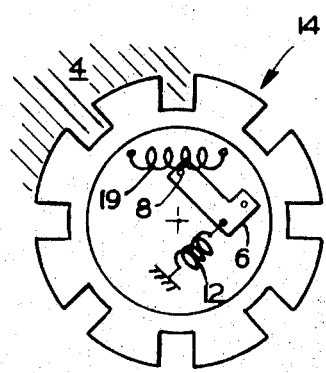

To alleviate shock due to abrupt stopping when pawls 6 and 6A engage detents 14 and 14A (FIG. 3), the design can be altered by providing a compliance factor as shown in FIGS. 4 and 5.

Thus, as shown in FIG. 4, detents 14 are machined or otherwise provided on an idler or sleeve 16 which fits closely in stationary structure 4 and is free to rotate about the axis of shaft 2. A spring 18 is mounted to idler 16 and to stationary structure 4 so that when pawl 6 engages a detent 14 idler 16 rotates and a dampening action occurs because of the spring force. Alternatively, as shown in FIG. 5, pivot 8 of pawl 6 may be mounted to a spring 19 to provide the aforenoted dampening action when pawl 6 engages a detent 14.

Figure 6:
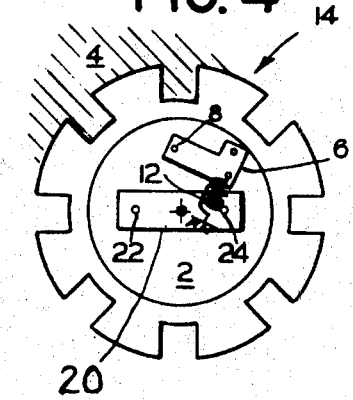
FIGS. 6 and 7 are diagrammatic representations showing angular acceleration sensitive means for improving the response of the device of the invention.
Figure 7:
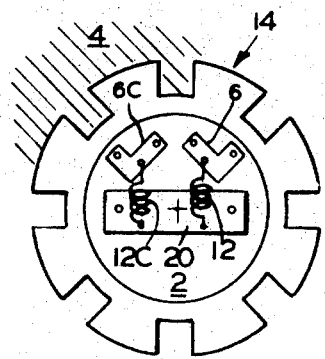

It may be necessary to improve the response of the device and means for accomplishing this is shown in FIGS. 6 and 7.

Thus, in FIG. 6, an arm 20 having angular acceleration sensing weights 22 and 24 is mounted for rotation about the axis of shaft 2. Restraining spring 12 mounted to pivot 6 is mounted to arm 20 and when shaft 2 accelerates rapidly in a clockwise direction, arm 20 lags the shaft motion and relieves the restraint on pawl 6 provided by spring 12 so that the pawl motion depends upon both the rate and acceleration of shaft 2. A similar arm and pawl may be used for counterclockwise shaft inputs or both may be accommodated by mounting a pawl 6C on the opposite end of arm 20 and restrained by a spring 12C mounted to the arm as shown in FIG. 7.

The device of the invention is useful as a speed limiter for a rotating member wherein excessive rotational rates which cause structural deterioration must be prevented. Rotation is restrained by friction alone, or, when increased restraining force is necessary, by providing detents for engaging a pawl. In the latter instance, the rapid stoppage of rotation is eased by including a compliance element in the structural arrangement and the response of the device is improved by adding an angular acceleration sensitive linkage.

While several embodiments of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:
1. A rate regulator for a rotating shaft, comprising:
a relatively stationary member surrounding the shaft;
an idler having a plurality of detents thereon and mounted intermediate the relatively stationary member and the shaft, and displaceable about the axis of rotation of the shaft;
a pawl pivotally mounted to the shaft and eccentric thereto;
a restraining spring mounted to the pawl and to the shaft;
the pawl being responsive to the restraining action of the spring and the centrifugal force developed when the shaft rotates above a predetermined rate to pivot for engaging one of the idler detents to develop a force for restraining rotation of the shaft; and
another restraining spring mounted to the idler and to the relatively stationary member and providing a compliance force when the pawl engages the one idler detent.

References Cited

UNITED STATES PATENTS

| 654,620 | 7/1900 | Garver | 188—184 X |
| 2,499,533 | 3/1950 | Sohlberg | 188—184 |
| 2,685,946 | 8/1954 | Pferd et al. | 188—184 |

FOREIGN PATENTS

| 68,321 | 4/1915 | Austria | 188—184 |
| 1,031,590 | 6/1958 | Germany | 188—184 |
| 1,252,266 | 10/1967 | Germany | 188—184 |
| 463,099 | 4/1951 | Italy | 188—82.2 |

DUANE A. REGER, Primary Examiner

U.S. Cl. X.R.

188—82.2